June 26, 1928.

A. C. TAYLOR 1,674,670

ELECTRIC TRANSFORMER

Filed Sept. 10, 1923

Inventor

A.C. TAYLOR.

By

Attorneys

June 26, 1928.
A. C. TAYLOR
1,674,670
ELECTRIC TRANSFORMER
Filed Sept. 10, 1923
2 Sheets-Sheet 2
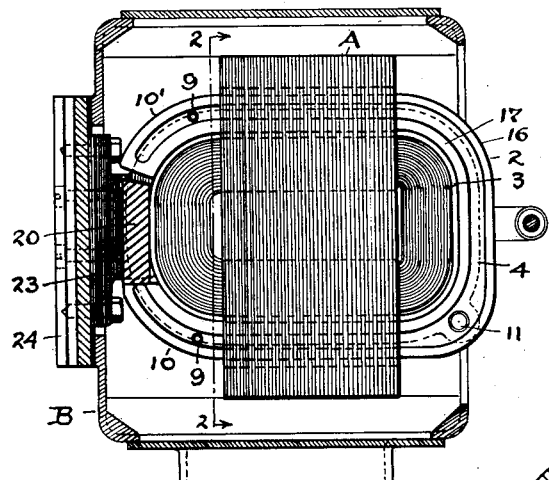
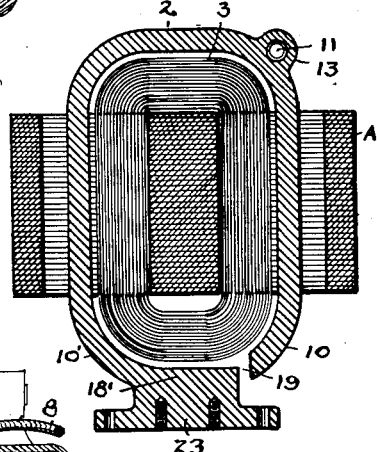
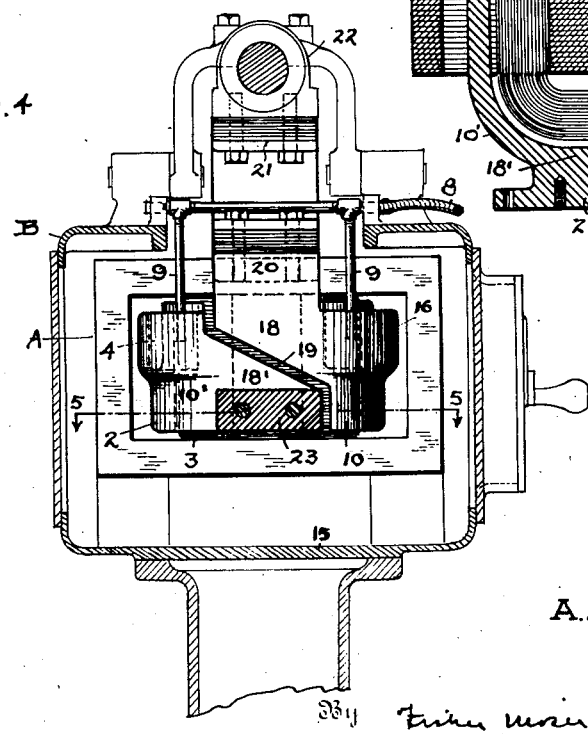
Inventor
A. C. TAYLOR.
By
Attorney Patented June 26, 1928.

1,674,670

UNITED STATES PATENT OFFICE.

ALBERTIS C. TAYLOR, OF WARREN, OHIO.

ELECTRIC TRANSFORMER.

Application filed September 10, 1923. Serial No. 661,778.

My invention relates to an improvement in electric transformers, and my general object is to provide a transformer adapted to give efficient service when used with electric heating and welding apparatus, especially when subjected to heavy and continuous use in practicing resistance methods of heating and welding where a heavy current at low voltage is required. The resistance offered by the low conductivity or size of the parts to be heated or welded causes said parts to heat up to the desired temperature, and the transformer that supplies the electric current generally comprises a secondary winding of only one heavy turn in which excess copper is provided to prevent the secondary itself from becoming over-heated by the heavy flow of current within it. In such constructions the connections between the transformer and the work holders also have a tendency to heat as it is almost impossible to make perfect electrical connections for heavy currents at low voltage by bolting or screwing the conducting parts together. Practically all the trouble in welding transformers is caused by a secondary which permits overheating, the heat being generated in the secondary and conducted to the primary coil, and when the insulated primary coil is subjected to excessive heat the insulation deteriorates rapidly and soon loses its insulating qualities and the coil breaks down and causes short circuits. To obviate such troubles and increase the life and durability and efficiency of the transformer I provide a secondary adapted to be connected in water-circulating connection with the heating or welding electrodes connected with the transformer, and this secondary is also particularly constructed with overlapping ends to make a complete turn in close relation to the primary coil, all as hereinafter shown and described in greater detail and more concisely pointed out in the claims.

In the accompanying drawings, Fig. 1 is a side elevation and part section of an electric welding machine embodying my improved transformer and invention.

Fig. 3 is a horizontal section of the welding machine on line 3—3 of Fig. 1 and a top view of the transformer therein. Fig. 4 is a vertical section of the welding machine on line 4—4 of Fig. 1, and a front view of the transformer therein.

Fig. 5 is a horizontal section of the transformer only, on line 5—5 of Fig. 4.

Figure 1:
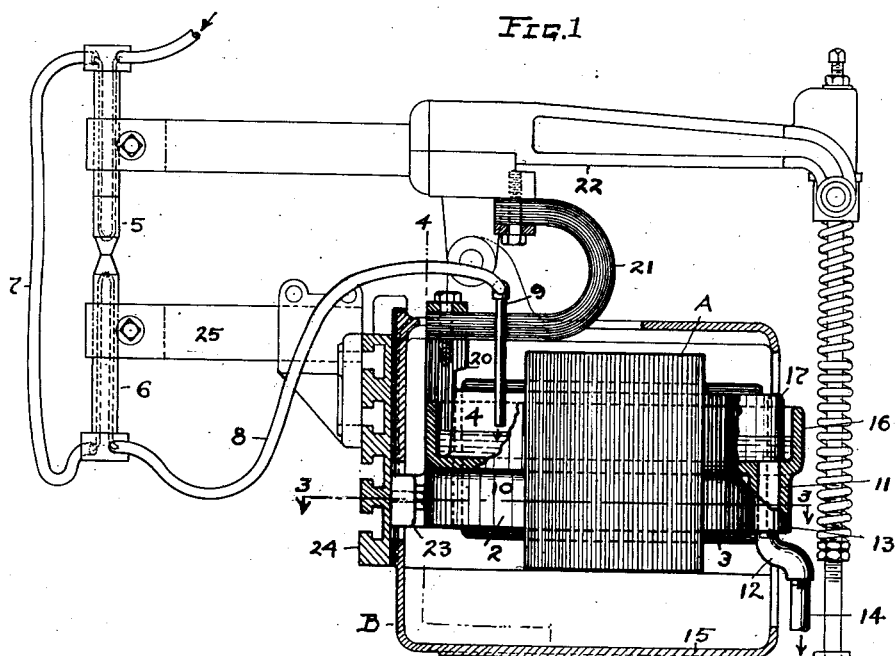
Figure 2:
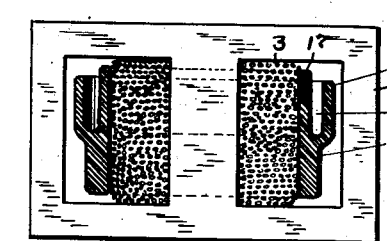
Fig. 2 is a vertical cross section on line 2—2 of Fig. 3 of the transformer only.
Figure 2:
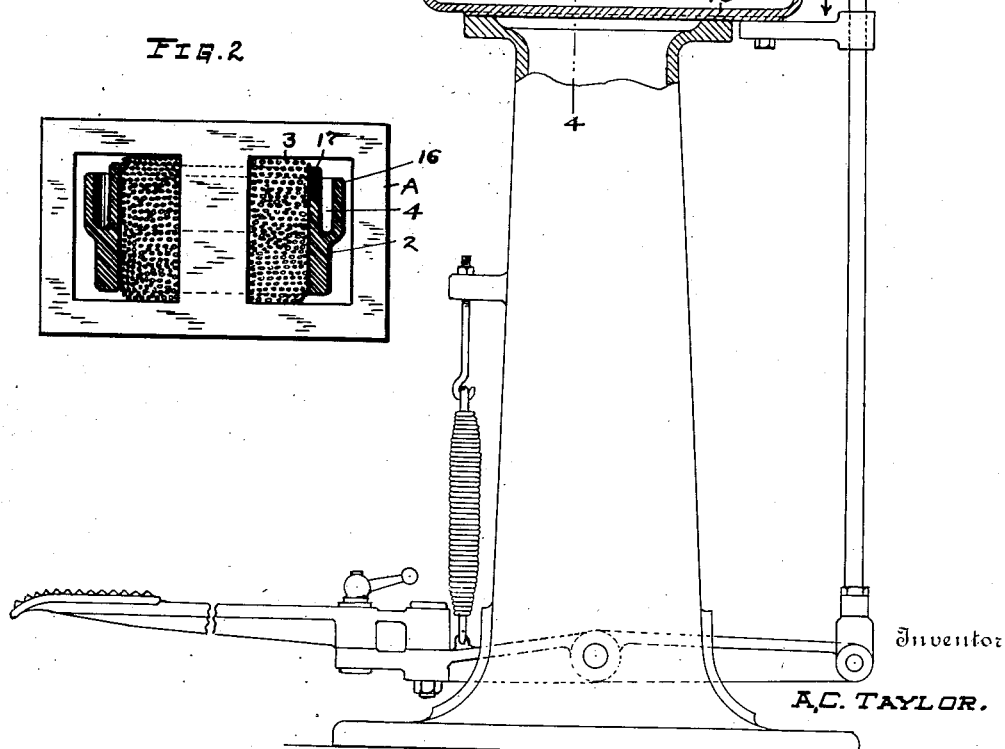

The invention involves an electric transformer A having a solid copper secondary 2 completely enveloping a primary coil 3 and formed with an open channel or groove 4 in its top adapted to hold and circulate water for cooling purposes, and the transformer is shown in the present instance as a part of a welding or heating machine B having a pair of water-cooled electrodes 5 and 6, respectively, connected together by a water-circulating pipe or hose 7 and also connected to the transformer by a flexible tube 8 which is adapted to deliver the water, after passing through the electrodes, to channel 4 in secondary 2 by way of a fixed pipe or discharge nipple 9 extending downwardly into said channel.

It is a general practice to circulate water through the electrodes or the work or electrode holders of electric heating and welding machines, but in so far as I am aware no provision has been made heretofore in such machines for water-cooling the transformer, and while the water for cooling the transformer may be supplied independently thereto I prefer to first pass the water through the electrodes or holders and thence to and through the secondary of the transformer, in this way regulating the amount of water flowing to and through the secondary and simplifying the control of flow of the water from a common source of supply and avoiding waste and expense. I also prefer to use a pair of water delivery nipples 9—9 to divide the flow of water equally to the two legs or divided front ends 10—10 of the secondary, and to provide the secondary with a single overflow or discharge outlet 11 at its rear end where an elbow or bent fitting 12 is connected to a boss 13 through which the used water is free to flow to a vertical discharge or drain pipe 14 located outside of the hollow body 15 of the welding machine.

Secondary 2 is in the form of a divided loop, turn or coil, which is cast or otherwise produced from copper, and the water channel 4 therein is formed by an offset or flange 16 which may extend upwardly from about mid-height of the secondary to approximately the same height or level as the top edge 17 of the main inner body portion of the secondary, but preferably not as high to permit an overflow of water outwardly should the discharge at the outlet be impeded. However the outlet for the waste water is located at some distance below the upper edge of the channel to prevent the water from overflowing, although the outlet pipe or nipple may be set or extend high enough into the channel to insure that a certain amount of water will always be present within the channel.

The transformers of heating and welding machines in general use comprise secondaries which extend only part way around the primary coil, usually making only a little over three-fourths of a turn relatively to the primary coil, the full turn or coil of the secondary being completed by the distant secondary leads or conductors and the work.

In contradistinction, the secondary in the present transformer is particularly constructed to provide a complete turn in itself in close relation to the primary coil. Thus, the front ends of the legs 10—10' of secondary 2 are extended laterally toward each other and overlapped one above the other, these lateral extensions 18—18' being separated by a narrow space 19 extending obliquely or at a horizontal slant across the front of the secondary, thereby forming tapering overlapping extensions for the legs 10—10'. Upper extension 18 is also projected upwardly on straight lines to provide a connecting terminal 20 for a laminated conductor 21 having a reverted end attached to the tilting arm 22 which carries upper electrode 5. Lower extension 18' is provided with a forwardly-projecting foot portion which serves as a connecting terminal 23 for a rabbeted bed-plate 24 which carries the horn or holder 25 for lower electrode 6, and the two terminals 20 and 23, respectively, are both located on the vertical longitudinal medial line of the transformer and machine. The lateral ends of the legs of the secondary overlap from four to twelve inches, dependent upon the size of the transformer, and in effect provide a complete coil or turn of the secondary around the primary and in such close relation thereto that the efficiency of the transformer is greatly increased as compared with a transformer having a divided secondary which is spread open and far apart and merely connected by secondary leads to complete the turn remotely from the primary winding. In brief, I find that the overlapping and water-cooling construction of the secondary permits the transformer to be used for heavy and continuous duty and to operate efficiently without overheating and with a prolonged life.

The water-circulating channel in the secondary is open at its top to permit the water to flow therethrough at atmospheric pressure, and consequently the copper electrode will not sweat through and affect or endanger the primary coil. The water also flows through a relatively deep channel and in direct contact with the copper and spreads over a relatively large area within the body of copper, thereby promoting quick and efficient cooling effects throughout the secondary. The looped secondary also lies flat with its two legs in the same horizontal plane, thereby permitting the air currents to rise vertically by natural draft around the primary coil and the secondary walls and past the open channel, thereby also promoting cooling results and the carrying away of any evaporations or accumulating moisture above the open channel. The two terminals are also placed one above the other in the vertical medial plane of the transformer and machine which permits the conductors to be superposed and conveniently extended to and connected with a pair of vertically arranged electrodes on short and direct lines. A secondary made in the shape and form as shown and described herein may be readily cast of copper, and an open channel is cast therein in preference to drilling or coring a closed channel because cast copper is apt to be more or less porous and honey-combed internally and a seemingly closed channel may possess water escape openings or permit seepage, especially when the water is circulated through a closed channel under pressure.

What I regard as my invention or discovery and desire to claim, is:

1. An electric transformer, comprising a horizontally arranged secondary made in the form of a loop and having a flange integral with and spaced apart from its top portion providing a water cooling space therein.

2. An electric transformer comprising a horizontally arranged secondary made of a heavy body of electric conducting material and formed on its top portion with an offset integral flange to provide an open water-circulating chamber therein.

3. An electric transformer, comprising a horizontally arranged secondary in the form of a heavy single loop having an open channel for a cooling fluid extending lengthwise throughout its top portion and provided with an overflow opening for the fluid.

4. An electric transformer, comprising a horizontally arranged loop-shaped secondary having separated extremities and an open water-circulating channel in its top portion extending from one extremity to the other and provided with an outlet, in combination with a pair of water delivery pipes extending into said channel at said extremities.

5. An electric transformer, comprising a solid heavy secondary of loop shape obliquely divided at one end, having separate terminals where divided, and provided with a water circulating open and relatively deep channel extending along its sides having an outlet opposite said divided end of the loop.

6. An electric transformer, comprising a primary coil and a horizontally arranged secondary surrounding the same having a liquid circulating open groove in its upper edge and a liquid overflow opening therein, and means adapted to deliver liquid into said groove.

7. An electric transformer, comprising a primary coil, a divided secondary encircling said primary coil having a water chamber extending lengthwise from end to end thereof and open at its top to the atmosphere and water intake and discharge connections for said chamber.

8. An electric transformer, comprising a primary coil, a horizontally arranged secondary loop having a relatively deep and open water circulating channel extending from its top, the inner wall of said channel adjacent the primary coil being higher than the outer wall, and water intake and discharge connections for said channel.

9. An electric transformer, comprising a divided loop-shaped secondary having spaced inner and outer walls to provide an open water circulating space, said walls being of different heights and the top of said space being open to the atmosphere.

In testimony whereof I affix my signature hereto this 4 day of September, 1923.

ALBERTIS C. TAYLOR.